US012679342B2

(12) United States Patent
Iwabuchi

(10) Patent No.: US 12,679,342 B2
(45) Date of Patent: Jul. 14, 2026

(54) INFORMATION PROCESSING APPARATUS, INFORMATION PROCESSING METHOD, MOVABLE APPARATUS, AND RECORDING MEDIUM

(71) Applicant: CANON KABUSHIKI KAISHA, Tokyo (JP)

(72) Inventor: Kohei Iwabuchi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 18/737,717

(22) Filed: Jun. 7, 2024

(65) Prior Publication Data

US 2024/0416897 A1 Dec. 19, 2024

(30) Foreign Application Priority Data

Jun. 13, 2023 (JP) ................................. 2023-096751

(51) Int. Cl.
*B60W 30/08* (2012.01)
*B60W 40/105* (2012.01)
*G06V 20/58* (2022.01)

(52) U.S. Cl.
CPC .......... *B60W 30/08* (2013.01); *B60W 40/105* (2013.01); *B60W 2554/406* (2020.02); *B60W 2554/802* (2020.02); *B60W 2556/10* (2020.02); *G06V 20/58* (2022.01)

(58) Field of Classification Search
CPC ....... B60W 2520/10; B60W 2554/406; B60W 2554/802; B60W 2556/10; B60W 2754/30; B60W 30/08; B60W 30/09; B60W 30/0956; B60W 40/105; B60W 60/0017; G06V 20/58
See application file for complete search history.

(56) References Cited

U.S. PATENT DOCUMENTS

| | | | | |
|---|---|---|---|---|
| 9,645,577 B1* | 5/2017 | Frazzoli | ............ | B60W 60/0016 |
| 9,827,955 B2* | 11/2017 | Miller | ........................ | B60L 7/18 |
| 12,269,498 B1* | 4/2025 | Rommel | .............. | B60W 40/02 |
| 12,296,850 B2* | 5/2025 | Ling | ..................... | B60W 40/04 |
| 12,358,140 B2* | 7/2025 | Murray | .................. | B25J 9/1666 |

(Continued)

FOREIGN PATENT DOCUMENTS

| | | | | | |
|---|---|---|---|---|---|
| CN | 113474206 B | * | 4/2025 | ............ | B60K 35/50 |
| EP | 3608192 A2 | * | 2/2020 | ............ | B60W 30/16 |

(Continued)

*Primary Examiner* — Babar Sarwar
(74) *Attorney, Agent, or Firm* — Canon U.S.A., Inc. IP Divison

(57) ABSTRACT

An information processing apparatus acquires control-related information that includes dynamically changing environment information used for control of a movable apparatus, and adjusts, based on the acquired control-related information, a traveling rule that is followed by the movable apparatus. In addition, the information processing apparatus controls driving of the movable apparatus based on travel control information including the adjusted traveling rule. The control-related information includes, for example, map information, behavioral information of the movable apparatus, behavioral information of an obstacle, movable apparatus-specific information, road surface configuration information, traveling history information, and the like.

17 Claims, 15 Drawing Sheets

(56)       References Cited

U.S. PATENT DOCUMENTS

| | | | |
|---|---|---|---|
| 12,415,544 B2 * | 9/2025 | Liu | B60W 60/0015 |
| 2018/0046191 A1 * | 2/2018 | Keller | B60W 50/10 |
| 2022/0009488 A1 * | 1/2022 | Li | B60W 40/06 |
| 2022/0055615 A1 * | 2/2022 | Inoue | B60W 30/09 |
| 2022/0371588 A1 * | 11/2022 | Weston | G01C 21/3889 |
| 2023/0192084 A1 * | 6/2023 | Choi | B60W 30/16 |
| 2023/0219569 A1 * | 7/2023 | Zhao | B60W 60/001 |
| | | | 701/23 |
| 2023/0234574 A1 * | 7/2023 | Funabashi | B60W 30/0956 |
| | | | 701/301 |
| 2023/0278572 A1 * | 9/2023 | Stent | B60W 50/14 |
| | | | 701/23 |
| 2024/0001926 A1 * | 1/2024 | Singh | B60W 30/16 |
| 2024/0025404 A1 * | 1/2024 | Gupta | G06N 7/01 |
| 2024/0124010 A1 * | 4/2024 | Ahmad | B60W 40/08 |
| 2024/0270285 A1 * | 8/2024 | Ucar | B60W 30/0956 |
| 2024/0300485 A1 * | 9/2024 | Diamond | B60W 30/0956 |
| 2025/0104558 A1 * | 3/2025 | Pedersen | B60W 50/14 |

FOREIGN PATENT DOCUMENTS

| | | | |
|---|---|---|---|
| EP | 4001039 A1 * | 5/2022 | B60W 30/18009 |
| JP | 2020026154 A | 2/2020 | |
| KR | 102795005 B1 * | 4/2025 | B60W 50/10 |

* cited by examiner

| Traveling rule ID | Traveling rule |
|---|---|
| 1 | Travel on {left side} of path |
| 2 | Leave distance of {1.0} m from obstacle |
| 3 | Travel at speed of {4.0} km/h |
| 4 | {Decelerate to 2 km/h} when course intersects that of movable obstacle |
| 5 | Make turn {by decelerating just before} |

600

| Travel tendency ID | Time slot | Location | Tendency type | Tendency |
|---|---|---|---|---|
| 1 | 6:30 to 8:00 weekdays | Path A | Travel direction | Left side |
| 2 | 12:00 to 13:00 weekdays | Path C | Proximity frequency | 0.02 times/ minute |

| Traveling rule ID | Traveling rule | Default value |
|---|---|---|
| 1 | Travel on {left side} of Path | Right side |
| 2 | Leave distance of {1.0} m from obstacle | 1.0 |
| 3 | Travel at speed of {4.0} km/h | 3.0 |
| 4 | {Decelerate to 2 km/h} when course intersects that of movable obstacle | Shift course |
| 5 | Make turn {by decelerating just before} | Decelerating just before |

| Object ID | Object name |
|-----------|-------------|
| 1 | Movable apparatus |
| 2 | Left-side edge |
| 3 | Right-side edge |
| 4 | Obstacle A |
| 5 | Obstacle B |
| 6 | Obstacle C |

| Positional relationship information ID | Valid range | Object ID (1) | Object ID (2) | Relationship value |
|---|---|---|---|---|
| 1 | Path A | 1 | 2 | 1 |
| 2 | Path A | 1 | 3 | 5 |
| 3 | Path A | 1 | 4 | 2 |
| 4 | Path A | 1 | 5 | 3 |
| 5 | Path B | 1 | 2 | 5 |
| 6 | Path B | 1 | 3 | 1 |
| 7 | Path B | 1 | 6 | 2 |

1101     1102     1103     1104     1105

INFORMATION PROCESSING APPARATUS, INFORMATION PROCESSING METHOD, MOVABLE APPARATUS, AND RECORDING MEDIUM

BACKGROUND

Field

The present disclosure relates to a technology of controlling travel of a movable apparatus.

Description of the Related Art

Many technologies for automated travel and driving assistance of movable apparatuses have been proposed in the past. The driving support apparatus described in JP 2020-26154 A, for example, uses the technology called "adaptive cruise control (ACC)" for maintaining an inter-vehicle distance between the vehicle with the apparatus and preceding vehicles at a target value. When a signal of a change request for a target travel condition (corresponding to a target inter-vehicle distance) in ACC is generated through an operation of an operation button by the driver, the driving support apparatus performs control of allowing the change request under a specific condition.

As movable apparatuses moving within facilities, for example, security robots in commercial facilities, serving robots in restaurants, and the like are known. Such movable apparatuses mainly sharing a movement space with people travel based on predetermined rules such as right-side travel or left-side travel.

In an environment where there are no regularities in positions and motions of obstacles such as people in a facility or the like, however, if a movable robot tries to strictly comply with the rules, there is concern that work efficiency of the movable robot will be rather degraded, and there will be a risk of colliding with obstacles. For this reason, although it is desirable to change the traveling rules of the movable apparatuses in a timely manner, in the technologies, such as one in JP 2020-26154, in which traveling conditions are changed by signals given from outside (through operations of the driver), the degree of freedom in travel of the movable robot becomes lower.

SUMMARY OF THE INVENTION

Therefore, the present disclosure provides improved technology for increasing the degree of freedom in travel of a movable apparatus.

An information processing apparatus according to an aspect of the present disclosure includes a memory storing instructions; and a processor executing the instructions causing the information processing apparatus to acquire control-related information for control of a movable apparatus, including dynamically changing environment information, adjust a traveling rule to follow for travel of the movable apparatus based on the control-related information, and control driving of the movable apparatus based on travel control information including the adjusted traveling rule.

Further, features of the present disclosure will become apparent from the following description of exemplary embodiments with reference to the attached drawings.

BRIEF DESCRIPTION OF THE DRAWINGS

FIG. 9 is a diagram illustrating an example of a traveling rules table according to a fourth embodiment.

FIG. 13 is a diagram illustrating an example of a position relationship information table according to the sixth embodiment.

DESCRIPTION OF THE EMBODIMENTS

Figure 1A:
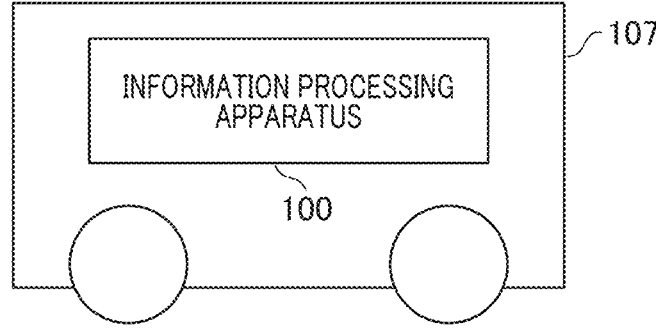
FIG. 1A is a diagram illustrating a configuration of a movable apparatus according to a first embodiment.

Next, embodiments of the present disclosure will be described with reference to the drawings. The same reference numerals are given to constituent elements having the same configuration or function in the drawings, and repetitive description thereof will be omitted. The configurations introduced in the embodiments below are merely examples, and the present disclosure is not limited to the illustrated configurations.

First Embodiment

FIG. 1A is a diagram illustrating a configuration of a movable apparatus according to a first embodiment. A movable apparatus 107 is a moving robot, for example, an autonomous mobile robot (AMR), an automated guided vehicle (AGV), or the like. In the present embodiment, the movable apparatus 107 is assumed to move, for example, within a facility. "Within a facility" means "within premises" in which the facility is located, regardless of whether the moving space is inside (inside a building) or outside (outside a building).

The movable apparatus 107 has an information processing apparatus 100 mounted therein. The movable apparatus 107 uses a sensor 105, which will be described below, to be able to detect an obstacle present around the movable apparatus 107 and take an evasive action when the distance between the movable apparatus 107 and an obstacle is shorter than a predetermined distance (which will be denoted by a "proximity limit distance" below).

In the present embodiment, an obstacle is mainly assumed to be a moving object, particularly a person. An obstacle is not limited to a person, and includes an animal and another robot. An obstacle is not limited to a moving object, and may include an object temporarily placed on a travel route, or the like. Although it is assumed that there will be one or more obstacles, it is assumed that there will be more situations in which multiple obstacles are present than situations in which there is only one.

Figure 1B:
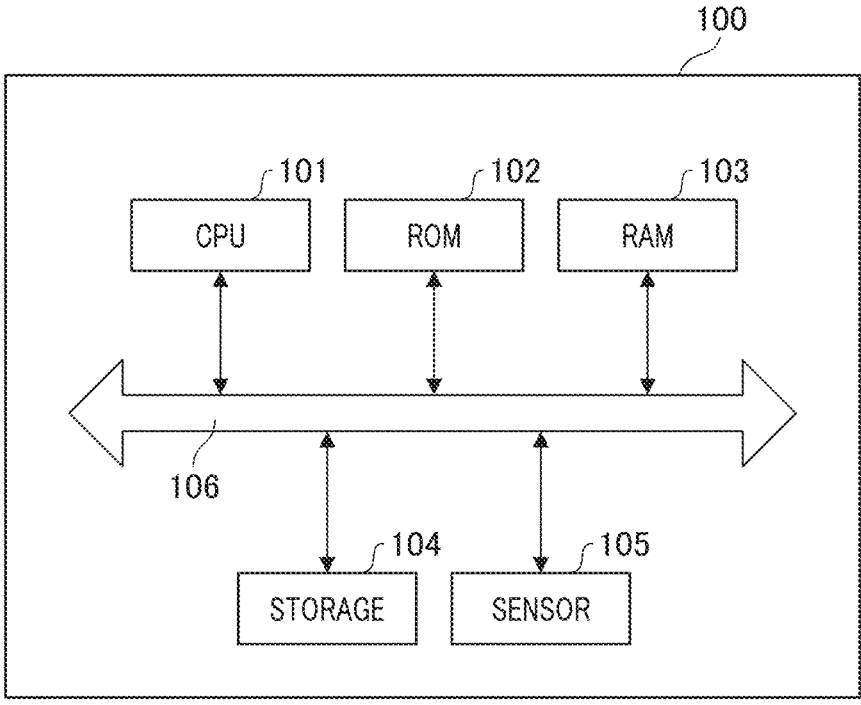
FIG. 1B is a hardware configuration of an information processing apparatus.

FIG. 1B is a diagram illustrating a hardware configuration of the information processing apparatus 100. The information processing apparatus 100 includes a central processing unit (CPU) 101, a read-only memory (ROM) 102, and a random access memory (RAM) 103. In addition, the information processing apparatus has a storage 104 and a sensor 105. Each of these elements is connected to the others by a system bus 106.

The CPU 101 performs arithmetic operations, logical determinations for various kinds of processing, and controls each of the elements connected to the system bus 106. Instead of the CPU 101, a programmable logic device (PLD) such as a field programmable gate array (FPGA) may be used. Alternatively, an application-specific integrated circuit (ASIC) may be used. Alternatively, a digital signal processor (DSP), or the like may be used.

The read-only memory (ROM) 102 is a program memory that stores programs for control by the CPU 101, including various processing procedures executed in the information processing apparatus 100.

The random access memory (RAM) 103 is used as a temporary storage area of a main memory or a work area of the CPU 101.

Further, a program memory is not limited to the ROM 102, and an external storage device, which is not illustrated, connected to the information processing apparatus 100 by wire or wirelessly may be employed. In this case, the information processing apparatus 100 loads a program into the RAM 103 from the external storage apparatus.

The storage 104 is an auxiliary storage apparatus for storing electronic data and programs. As examples of the auxiliary storage apparatus, a hard disk drive and a solid-state drive are known. An external storage apparatus that plays the same role as the storage 104 may be used. A representative external storage apparatus of the storage 104 can be realized by, for example, a medium (recording medium) and an external storage drive for realizing access to the medium. As such media, for example, a flexible disk (FD), a compact disc (CD)-ROM, a digital versatile disc (DVD), and the like are known. Alternatively, a magneto-optical disk (MO), a flash memory, or the like may be employed. Alternatively, the external storage apparatus may be a storage apparatus, a server apparatus, or the like that is connected through a network.

The sensor 105 is a device that mainly performs, acquisition of information about a speed and a direction of progress of the movable apparatus 107, and detection of an obstacle present around the movable apparatus 107 and acquisition of behavioral information thereof. The sensor 105 may be constituted by a plurality of types of devices.

The behavioral information of an obstacle mainly includes a position, a speed, and a direction of progress of the obstacle, and typically means a relative position, a relative speed, and a relative direction of progress of an obstacle to the movable apparatus 107. The relative position of an obstacle corresponds to a distance between the movable apparatus 107 and the obstacle.

In addition, the behavioral information of obstacles may further include the number or density of obstacles. A density of obstacles means the number of obstacles present within a certain space acquired by the sensor 105.

Position information of the movable apparatus 107 can be acquired by using, for example, a technology of self-position estimation, which will be described below. Information about a position, a speed, and a direction of progress of the movable apparatus 107 may be referred to as behavioral information of the movable apparatus 107.

An example of the sensor 105 that detects a speed and a direction of progress of the movable apparatus 107 is an inertial measurement unit (IMU). An IMU can detect a tilt and an angular velocity of the movable apparatus 107. The sensor 105 that detects a speed is not limited to an IMU, and may be an encoder or the like that detects a rotation speed of a motor, which is not illustrated, that drives the movable apparatus 107 to travel.

Examples of the sensor 105 for acquiring behavioral information of an obstacle include light detection and ranging (or laser imaging detection and ranging (LiDAR)), and a camera. As a camera, a passive stereo camera can be used. A LiDAR detects whether there is an obstacle by using reflected light of an emitting laser. The camera detects the presence or absence of an obstacle based on a distance value of feature points within a stereo image.

Examples of the sensor 105 used for acquiring behavioral information of an obstacle include a LiDAR and a Doppler radar. The LiDAR or the Doppler radar acquires information of a relative position, a relative speed, and a relative direction of progress of an obstacle to the movable apparatus 107.

Further, the information processing apparatus 100 may acquire behavioral information of the movable apparatus and acquire (calculate) a relative position, a relative speed, and a relative direction of progress of an obstacle based on information of the obstacle obtained from the camera or other sensors.

In a case that the movable apparatus 107 is a robot loaded with cargo and carrying it, the sensor 105 may include a device that detects the weight of the cargo.

Figure 2:
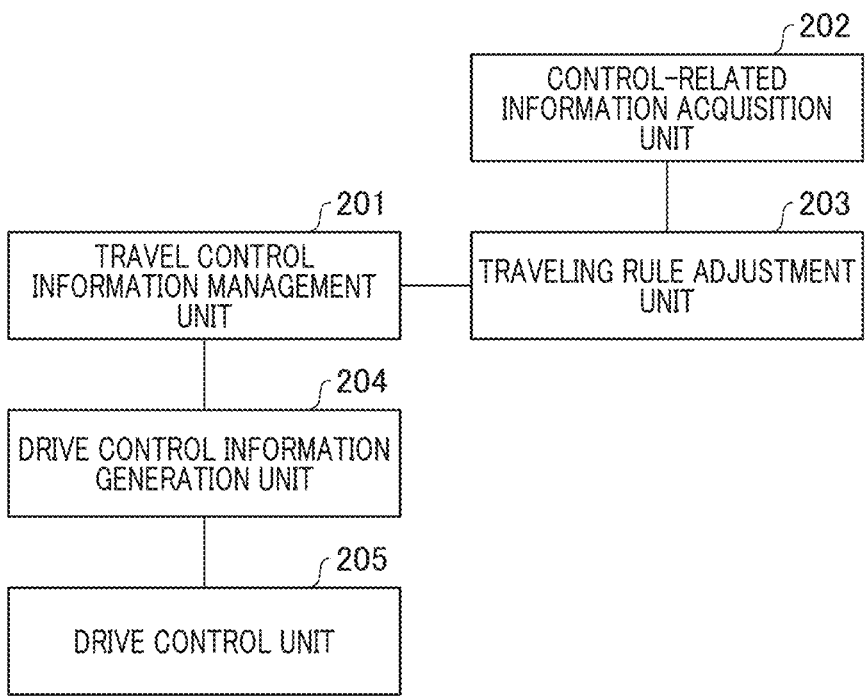
FIG. 2 is a block diagram illustrating an example of a functional configuration of the information processing apparatus.

FIG. 2 is a block diagram illustrating an example of a functional configuration of the information processing apparatus 100. The information processing apparatus 100 includes a travel control information management unit 201, a control-related information acquisition unit 202, a traveling rule adjustment unit 203, a drive control information generation unit 204, and a drive control unit 205.

The travel control information management unit 201 manages travel control information. The travel control information mainly includes information about traveling rules, and also includes map information.

The map information includes information about travel routes of the movable apparatus 107, and terrain information indicating terrain around the travel routes of the movable apparatus 107. The map information is stored in the storage 104 or the above-described external storage apparatus in advance. The information processing apparatus 100 may generate and acquire terrain information in real time by using a technology such as simultaneous localization and mapping (SLAM), or the like.

A travel route is a path or a route through which the movable apparatus travels. Terrain is the shape of ground surfaces, walls, columns, and the like constituting a path. Traveling rules are rules that the movable apparatus 107 needs to follow for travel. Traveling rules are used for generating drive control information (information for controlling a drive state of the movable apparatus 107) by the drive control information generation unit 204.

The control-related information acquisition unit 202 acquires control-related information for controlling the movable apparatus 107. The control-related information acquisition unit 202 functions as an acquisition means for acquiring control-related information in cooperation with hardware such as the CPU 101 or the like. The control-related information includes the following information.

Map information

Behavioral information of the movable apparatus

Behavioral information of obstacles

Movable apparatus-specific information

Road surface configuration information

Traveling history information

At least the map information and the behavioral information of obstacles of the control-related information are included in environment information (dynamically changing information about the surrounding environment of the movable apparatus 107). The movable apparatus-specific information refers to information specific to the movable apparatus 107, for example, the width and weight of the movable apparatus 107, the weight of the load being loaded, the distance to an obstacle in the detection range, and/or the remaining capacity of the battery.

The road surface configuration information is configuration information of road surfaces on travel routes, for example, information about friction coefficients of road surfaces, unevenness of road surfaces, and/or gradients of road surfaces. A friction coefficient of a road surface depends on the material of the road surface as well as the degree of dryness of the road surface (the difference between when it is dry and wet).

The traveling history information is information based on movement histories of the movable apparatus 107 and each obstacle present around the movable apparatus 107.

The traveling rule adjustment unit 203 acquires a traveling rule from the travel control information management unit 201 and adjusts the acquired traveling rule based on control-related information acquired by the control-related information acquisition unit 202. The traveling rule adjustment unit 203 functions as an adjustment means for acquiring a traveling rule and adjusting the acquired traveling rule in cooperation with hardware such as the CPU 101 or the like.

The drive control information generation unit 204 generates drive control information based on travel control information including the traveling rule adjusted by the traveling rule adjustment unit 203.

The drive control information at least includes a correction amount representing the degree to which the movable apparatus is traveling deviating from the travel route to the left or right (which will be referred to as a travel route correction amount) and a speed of the movable apparatus 107, and also includes a proximity limit distance to an obstacle, an upper speed limit of the movable apparatus 107, or the like.

The drive control unit 205 performs drive control of the movable apparatus 107 based on the drive control information. A control signal from the drive control information 205 is input to a drive mechanism (not illustrated) such as various types of motors that drive the movable apparatus 107.

The drive control information generation unit 204 and/or the drive control unit 205 function as a control means for controlling drive of the movable apparatus based on the travel control information including the adjusted traveling rule in cooperation with hardware such as the CPU 101.

The information processing apparatus 100 has a function of acquiring position information of the movable apparatus 107 in addition to the functions illustrated in FIG. 2. Specifically, the information processing apparatus 100 stores a program for estimating its own position in the ROM 102, the storage 104, or the like and acquires position information of the movable apparatus 107 based on the program. For example, SLAM is used for the estimation of its own position. Alternatively, the information processing apparatus 100 may have a global navigation satellite system (GNSS) sensor as the sensor 105 for acquiring the position information. In this case, the map information needs to be associated with map information of the Earth's coordinate system.

Figure 3:
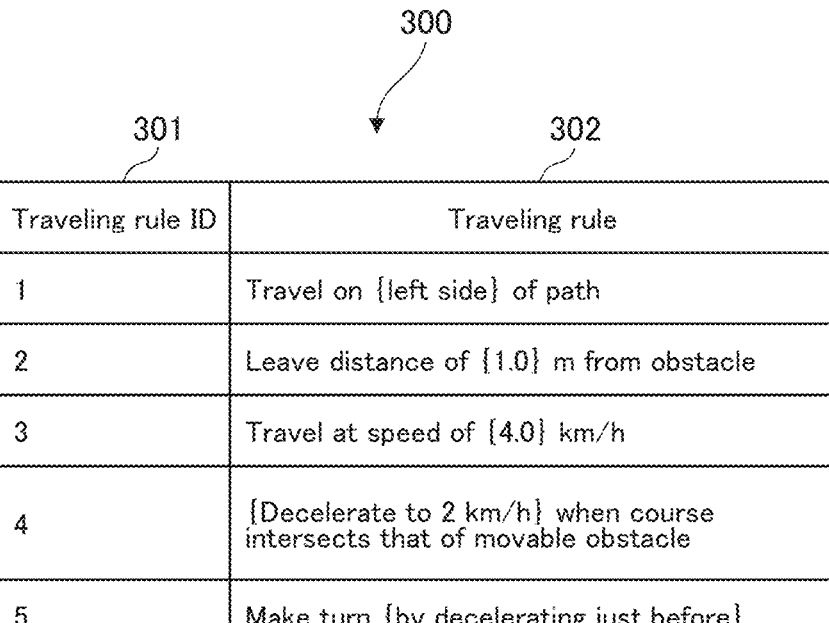
FIG. 3 is a diagram illustrating an example of a traveling rules table according to the first embodiment.

FIG. 3 is a diagram illustrating an example of a traveling rules table used by the travel control information management unit 201 to manage traveling rules. The traveling rules table 300 is stored in the storage 104 or the external storage apparatus in advance.

In the field of traveling rule ID 301, IDs for uniquely identifying traveling rules stored in the traveling rules table 300 are described.

In the field of traveling rule 302, details of the traveling rules that are details of instructions to be transmitted to the drive control information generation unit 204 are described. The following five items are set as details of the traveling rules.

The traveling rule ID "1" indicates "travel on the {left side} of the path".

The traveling rule ID "2" indicates "leave a distance of {1.0} m from obstacles".

The traveling rule ID "3" indicates "travel at a speed of {4.0} km/h".

The traveling rule ID "4" indicates "{decelerate to 2 km/h} when the course intersects that of a movable obstacle".

The traveling rule ID "5" indicates "make a turn {by decelerating just before}".

The instructions inside the curly braces { } included in the traveling rule 302 indicate rule parameters. The rule parameters are variable values that can be set by, for example, the traveling rule adjustment unit 203. In an initial state, predetermined default values are set for the rule parameters.

Figure 4A:
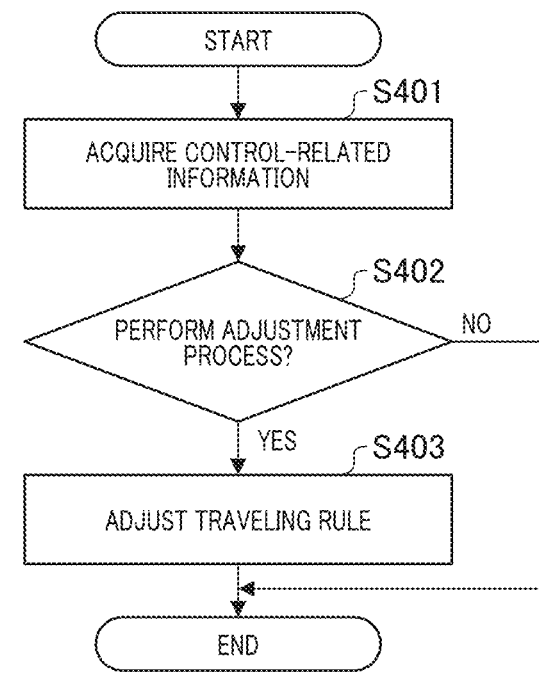
FIG. 4A is a flowchart showing a process of adjusting traveling rules.

FIG. 4A is a flowchart showing a process of adjusting traveling rules by the traveling rule adjustment unit 203. In the present process, the CPU 101 reads a program corresponding to the process details from the ROM 102 or the storage 104 and loads the program into the RAM 103 for execution (the same applies to the flowcharts shown in the other drawings). The process described in the present flowchart is repeatedly performed, for example, at regular time intervals. The interval at which the process shown in FIG. 4A is performed may be varied according to a distance from the movable apparatus 107 to an obstacle or a density of obstacles present around the movable apparatus 107.

In S401, the traveling rule adjustment unit 203 acquires control-related information from the control-related information acquisition unit 202. In the present embodiment, for example, behavioral information of the movable apparatus 107 and environment information about peripheries of the movable apparatus 107 (e.g., map information and behavioral information of obstacles) out of the control-related information are acquired.

Figure 4B:
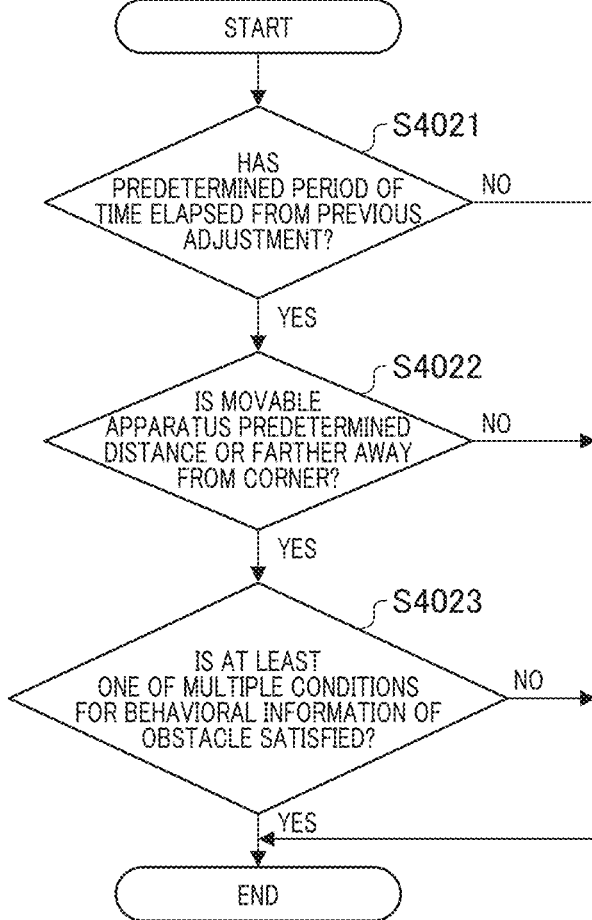
FIG. 4B is a flowchart showing a process of determining whether the process of adjustment is to be performed.

In S402, the traveling rule adjustment unit 203 determines whether a traveling rule is to be adjusted. When a traveling rule is to be adjusted, the process proceeds to S403. When a traveling rule is not to be adjusted, the process ends. FIG. 4B is a flowchart showing a process of determining whether the process of adjusting the traveling rule is to be performed in S402.

In S4021, the traveling rule adjustment unit 203 checks whether a predetermined period of time has elapsed from the previous adjustment of the traveling rule was performed. If the predetermined period of time has elapsed, the process proceeds to S4022. If the predetermined period of time has not elapsed, the traveling rule adjustment unit 203 determines not to adjust a traveling rule. The traveling rule adjustment unit 203 may check whether the movable apparatus 107 has moved a predetermined distance or longer from the point at which the previous adjustment of the traveling rule was performed, in accordance with the elapsed time. In this case, if the predetermined period of time has elapsed and the movable apparatus has moved the predetermined distance or longer, the process may proceed to the next step. In other cases, the traveling rule adjustment unit 203 determines not to adjust the traveling rule.

In S4022, the traveling rule adjustment unit 203 checks whether the movable apparatus 107 is a predetermined distance or farther away from an obstacle, a corner, a door, or the like. Information indicating whether the movable apparatus 107 is a predetermined distance or farther away from an obstacle, a corner, a door, or the like is an example of a position out of the behavioral information of the movable apparatus 107. If the movable apparatus 107 is the predetermined distance or farther away, the process proceeds to S4023. If it is not, it is determined not to perform adjustment of a traveling rule.

In S4023, the traveling rule adjustment unit 203 checks whether conditions for obstacles enumerated below are satisfied. If at least one of the conditions is satisfied, it is determined to perform adjustment of a traveling rule. If there is no condition satisfied, it is determined not to perform adjustment of a traveling rule.

In S4023, the first condition is satisfied if there is a change in behavior of an obstacle present around the movable apparatus 107. Specifically, that is a condition satisfied when one or more of obstacles present around the movable apparatus 107 have a change in their behavior to the level of a threshold or higher after previous adjustment of a traveling rule is performed. A change in behavior of an obstacle to the level of a threshold or higher means a change in at least one of a position, a speed, and a direction of progress of the obstacle to the level of the threshold or higher.

In S4023, the second condition is satisfied when the number of obstacles present around the movable apparatus 107 increases or decreases.

Note that the determination process of S402 is an example of a process of determining whether a traveling rule is to be adjusted based on a predetermined condition. In addition, an order of the present process is not limited to the order from S4021 to S4023, and may be different.

FIG. 4A will be described again. In S403, the traveling rule adjustment unit 203 adjusts a traveling rule. Specifically, the traveling rule adjustment unit 203 performs a rule parameter adjustment process as exemplified below on each of the traveling rules included in the traveling rules table 300.

For the traveling rule having the traveling rule ID "1", the traveling rule adjustment unit 203 first acquires map information from the travel control information management unit 201. Next, the traveling rule adjustment unit 203 acquires behavioral information of the obstacles present around the movable apparatus 107 from the control-related information acquisition unit 202. Next, the traveling rule adjustment unit 203 obtains a positional relationship between each of the obstacles and the left and right-side edges of the path. The left- and right-side edges of the path typically refer to side walls. Alternatively, in a case that an object is placed to be substantially in contact with a side wall, the edge refers to the object.

In addition, in a case that an obstacle has a bias to one of the left and right sides of the path, the traveling rule adjustment unit 203 sets the side of the bias among the left and right sides of the path (or the side of a greater bias; the same applies hereinbelow) for the rule parameter of the traveling rule ID "1". The reason for setting the side of the bias will be described below.

Here, if the width of a path is W, the distance from a certain obstacle to the left-side edge is Dleft, and the distance from the obstacle to the right-side edge is Dright, for example, the bias is a value derived from Dleft/w and Dright/W. If a smaller value of the above-described two values is lower than a threshold, the obstacle is determined to be closer to one side of the left and right sides of the path (have a bias). If the obstacle is determined not to have a bias (or a small bias; the same applies hereinbelow), no rule parameter is adjusted.

A bias of a single obstacle has been described above. In a case of a plurality of obstacles, the traveling rule adjustment unit 203 calculates the biases of individual obstacles by using the above-described method and calculates the bias of the entire obstacles based on the calculated biases thereof. A plurality of obstacles refer to a plurality of obstacles in a distance within the detection range of the sensor 105. For example, if a proportion of the number of obstacles 110 having a bias is a threshold or smaller, the traveling rule adjustment unit 203 determines that there is no bias, and if the proportion exceeds the threshold, the traveling rule adjustment unit determines that there is a bias.

Figure 5:
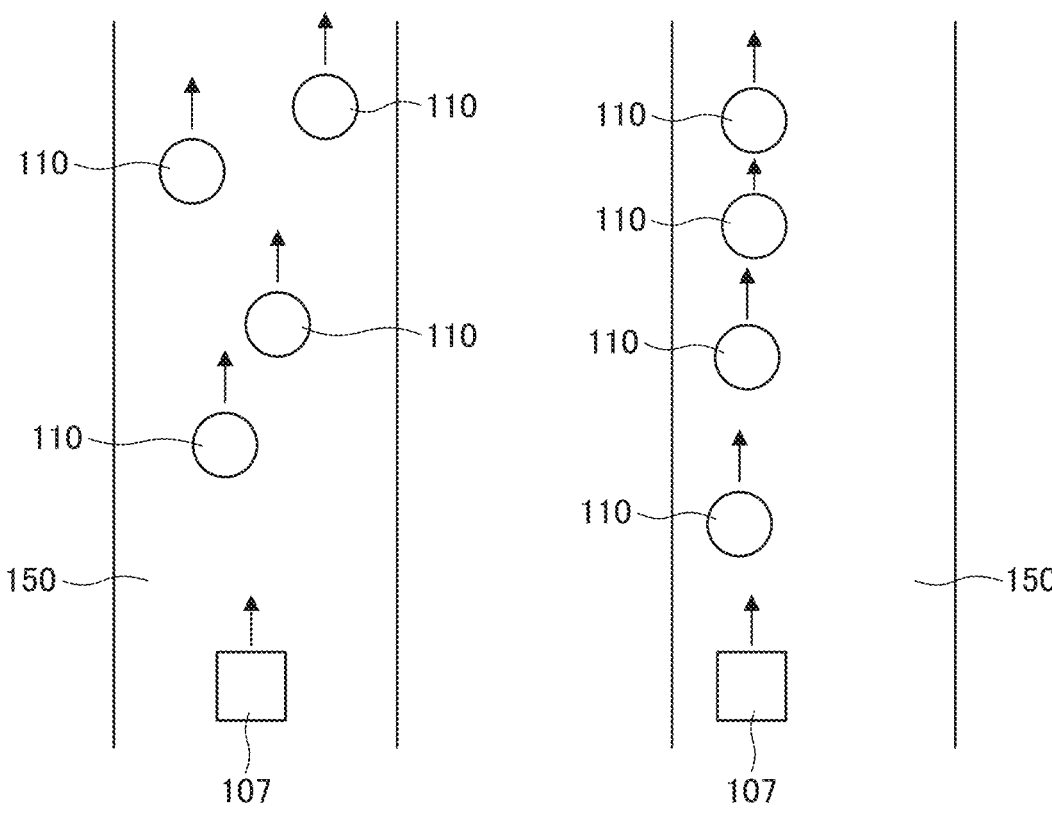
FIG. 5 is a diagram for describing a bias of a plurality of obstacles.

FIG. 5 is a diagram for describing a bias of a plurality of obstacles (here, people or other robots). A state in which all obstacles 110 are not biased is illustrated on the left side of FIG. 5, and a state in which all obstacles 110 are biased is illustrated on the right side of FIG. 5. The arrows indicate directions of progress of the obstacles.

The present embodiment has one objective that, when the obstacles 110 that are mainly people share a space with the movable apparatus 107, the movable apparatus 107 adjusts its own movement method in accordance with behavior of the surrounding obstacles 110. Thus, when the plurality of obstacles 110 are biased to the left side of a path 150, for example, as illustrated on the right side of FIG. 5, and move in the same direction of progress, the information processing apparatus 100 infers that there is the rule of left-side traveling on the path 150. Thus, the movable apparatus 107 travels in the same direction of progress to the left side, following the rule. Further, the direction of progress of the obstacles 110 is one piece of behavioral information of the obstacles, and the control-related information acquisition unit 202 acquires information of the direction of progress.

As a prerequisite for determining a bias of obstacle in the present embodiment, a case in which a detected obstacle moves in the same direction as the direction of progress of the movable apparatus 107 is assumed. On the other hand, when the direction of progress of one or more obstacles is the opposite direction to that of the movable apparatus 107, the side opposite to the side of the bias of the obstacles can be set as the rule parameter of the traveling rule ID "1". In this case, first, the traveling rule adjustment unit 203 acquires information that the direction of progress of one or more obstacles is opposite to that of the movable apparatus itself from the control-related information acquisition unit 202. Then, the traveling rule adjustment unit 203 calculates the bias of the one or more obstacles as described above, and sets the side opposite to the side of the bias as a rule parameter when there is a bias.

For the traveling rule having the traveling rule ID "2", the traveling rule adjustment unit 203 first acquires the density of the obstacles from the control-related information acquisition unit 202. Next, the traveling rule adjustment unit 203 determines the proximity limit distance of the obstacles to the movable apparatus 107 based on the acquired density of the obstacles. Then, the traveling rule adjustment unit 203 sets the proximity limit distance of the obstacles to the movable apparatus 107 as the rule parameter of the traveling rule ID "2". The proximity limit distance is set to be smaller as the density becomes higher, for example, and thus the movable apparatus 107 frequently detects obstacles, resulting in taking evasive actions, and thus the work efficiency can be prevented from deteriorating. The proximity limit distance to be set may be determined by using a lookup table of "density of obstacles" and "proximity limit distance". Alternatively, the proximity limit distance may be determined by using a function of "proximity limit distance of the movable apparatus 107 and obstacles" having "density of obstacles" as a parameter.

For the traveling rule having the traveling rule ID "3", the traveling rule adjustment unit 203 first acquires the density of the obstacles present around the movable apparatus 107 from the control-related information acquisition unit 202. Next, the traveling rule adjustment unit 203 determines the speed of the movable apparatus 107 based on the acquired density of the obstacles. Then, the traveling rule adjustment unit 203 sets the speed of the movable apparatus 107 as the rule parameter of the traveling rule ID "3". The speed is set to be lower as the density of the obstacles becomes higher, for example, and thus the movable apparatus 107 has a reduced risk of collision with the obstacles. The speed of the movable apparatus 107 to be set may be determined by using a lookup table of "density of obstacles" and "speed of movable apparatus 107", or may be determined by using a function of the "speed of the movable apparatus 107" having a "density of obstacles" as a parameter. Alternatively, the speed of the movable apparatus 107 to be set may be determined based on the distance from the movable apparatus 107 to the nearest obstacle, instead of the density of the obstacles.

Further, there may be a set limit on the options or range of values that can be set as rule parameters.

Figure 6:
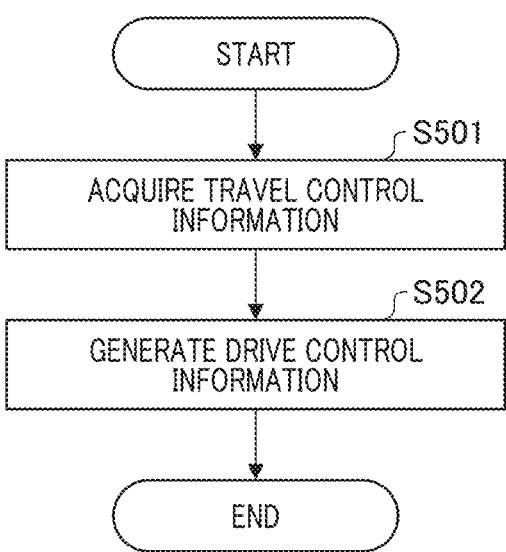
FIG. 6 is a flowchart showing a process of generating drive control information.

FIG. 6 is a flowchart showing a process of generating drive control information by the drive control information generation unit 204. The present process is performed each time the traveling rule adjustment unit 203 adjusts a traveling rule.

In S501, the drive control information generation unit 204 acquires travel control information (map information and traveling rules) from the travel control information management unit 201.

In S502, the drive control information generation unit 204 generates drive control information based on traveling rules. Specifically, the process of generating drive control information is performed with respect to each traveling rule as exemplified below.

With respect to the traveling rule having the traveling rule ID "1", the drive control information generation unit 204 generates the following drive control information. The drive control information generation unit 204 obtains the amount of travel route correction at each point on the travel route based on the map information, the rule parameter ("left side" or "right side"), the distance between the movable apparatus 107 and the side edge of the path, and the like, and sets the amount of travel route correction as drive control information. The distance between the movable apparatus 107 and the side edge of the path is a constant value or a value represented by a function of the "distance to the side edge of the path" having "each point on the travel route" as a parameter.

Further, the drive control information generation unit 204 obtains the amount of travel route correction for each variation of the rule parameter ("left side" or "right side") in advance, and acquires the amount of travel route correction corresponding to the rule parameter.

For the traveling rule having the traveling rule ID "2", the rule parameter "proximity limit distance to obstacles" is used as the drive control information.

For the traveling rule having the traveling rule ID "3", the rule parameter "speed of the movable apparatus" is used as the drive control information.

As described above, the information processing apparatus 100 according to the present embodiment adjusts traveling rules based on, particularly, behavioral information of the obstacles present around the movable apparatus 107 as the control-related information. In other words, since the information processing apparatus 100 autonomously adjusts the traveling rules according to the surrounding situations, the degree of freedom of the movable apparatus 107 in traveling can be enhanced. As a result, the work efficiency or task efficiency of the movable apparatus 107 can be improved, and the safety can be improved while reducing the possibility of collision with obstacles.

(Weighting Process)

In the first embodiment, the traveling rule adjustment unit 203 may apply weighting on input values of the calculation in the process of adjusting a traveling rule. For example, greater weight is set to an obstacle in a shorter distance (relatively closer position) to the movable apparatus 107 Thus, an obstacle that is closer to the movable apparatus 107, that is, an obstacle that is more likely to affect behavior of the movable apparatus 107, can be set to have a higher proportion of contribution to the adjustment result of traveling rules. An example in which weighting is applied in a process of adjusting rule parameters in the traveling rules table 300 shown in FIG. 3 will be described below.

When a bias of the position of an obstacle on the path is calculated in the process of adjusting the rule parameter of the traveling rule having the traveling rule ID "1", weight on the obstacle is changed based on the distance from the movable apparatus 107 to the obstacle. For example, greater weight is set when the distance becomes shorter. Specifically, the traveling rule adjustment unit 203 calculates the weighting factor based on the distance to the target obstacle, calculates the bias of the obstacle, and sets the calculated weighting factor for the calculated bias. If there are multiple obstacles around, weight may be set for each obstacle.

When a density of obstacles present around the movable apparatus 107 is acquired in the process of adjusting the rule parameter of the traveling rule having the traveling rule ID "2" or "3", weight on the obstacles is changed based on the distance from the movable apparatus 107 to each of the obstacles around it. For example, greater weight is set when the distance becomes shorter. Specifically, the traveling rule adjustment unit 203 calculates the weighting factor based on the distance to the target obstacle, calculates the density of the obstacles, and sets the calculated weighting factor for the calculated density. If there are multiple obstacles around, weight may be set for each obstacle.

Further, a value to which weighting is set is not limited to a bias or density of obstacles, and may be a speed or a direction of progress of obstacles.

Second Embodiment

In the first embodiment, the traveling rule adjustment unit 203 uses the behavioral information of the obstacles as control-related information in the process of adjusting the traveling rule shown in FIGS. 4A and 4B. However, in an adjustment process according to a second embodiment, in addition to or instead of the behavioral information of obstacles, movable apparatus-specific information and/or road surface configuration information can be further used. The width, weight, obstacle detection range, and the like of the movable apparatus 107 included in the movable apparatus-specific information have fixed values, and the detection range varies depending on the capability or software configuration of the sensor 105.

Figure 7:
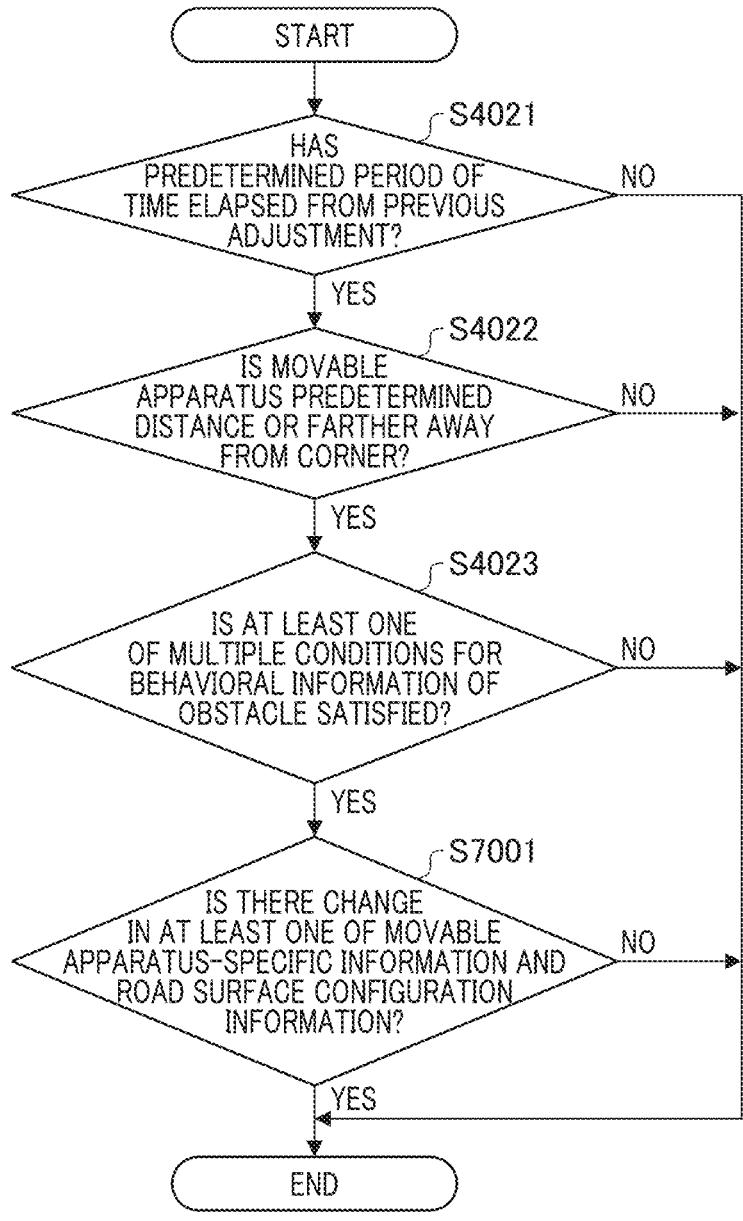
FIG. 7 is a flowchart showing a process of determining whether a traveling rule adjustment process using movable apparatus-specific information and road surface configuration information is to be performed according to a second embodiment.

Hereinbelow, a process of determining whether the traveling rule adjustment unit 203 adjusts a traveling rule by using the movable apparatus-specific information and road surface configuration information will be described. FIG. 7 is a flowchart showing this process. Since S4021 to S4023 of FIG. 7 are the same as those of FIG. 4B in the present process, description thereof will be omitted.

In the present process, a condition is further added to the step after S4023. In S7001, the traveling rule adjustment unit 203 checks whether there is a change in at least one of the movable apparatus-specific information and road surface configuration information after the previous adjustment of the traveling rule was performed.

Further, the above determination process is an example of a process of determining whether an adjustment means adjusts a traveling rule based on at least one of the movable apparatus-specific information and the road surface configuration information of the travel route of the movable apparatus. In addition, an order of the present process is not limited to the order of S4021, S4022, S4023, and S7001, and may be different. For example, the order of S7001 and S4023 may be reversed.

Hereinbelow, a process of the traveling rule adjustment unit 203 to adjust a rule parameter of a traveling rule shown in FIG. 3 by further using, for example, the movable apparatus-specific information and road surface configuration information will be described. The process of adjusting each rule parameter of the traveling rule IDs "3", "4", and "5" shown below is each example of the process of calculating a speed of the movable apparatus based on the movable apparatus-specific information and road surface configuration information when it is determined that the adjustment means adjusts a traveling rule.

A case that a rule parameter of the traveling rule having the traveling rule ID "3" is adjusted when there is a change in the road surface configuration information, for example, will be described. The traveling rule adjustment unit 203 first acquires the friction coefficient of the road surface from the road surface configuration information and acquires the distance to an obstacle in the detection range from the movable apparatus-specific information. The friction coefficient of the road surface in a specific road surface state is generally known.

By using the generally known relational formula (the following formula 1) for obtaining the braking distance shown below, a speed v at which the movable apparatus 107 detects an obstacle and then is able to stop before collision with the detected obstacle is calculated. Then, the traveling rule adjustment unit 203 sets the speed v as the rule parameter of the traveling rule ID "3". The braking distance of the movable apparatus 107 is calculated to correspond to the distance to the obstacle in the detection range.

$$\text{Braking distance (distance to the obstacle in the detection range)} = v^2/(254*\text{friction coefficient of the road surface}) \qquad \text{Formula 1}$$

Meanwhile, for the traveling rule having the traveling rule ID "3" as described above, the traveling rule adjustment unit 203 may be able to first acquire the position of a charging base for charging the battery of the movable apparatus 107 from the travel control information management unit 201. The position of the charging base may be stored, for example, by setting it as a fixed position in advance, or a signal including position information of the charging base transmitted from the charging base, an external server, or the like may be received.

Next, the traveling rule adjustment unit 203 acquires position information of the movable apparatus 107 and acquires information of the remaining capacity of the battery of the movable apparatus 107. Next, the traveling rule adjustment unit 203 obtains the distance between the position of the movable apparatus 107 and the charging base. Next, the traveling rule adjustment unit 203 obtains the speed of the movable apparatus 107 considering the remaining capacity of the battery and the distance. If the remaining capacity of the battery is small compared with the distance, for example, the speed at which the drive unit exhibits the highest operation efficiency is calculated so as not to waste the battery. Then, the traveling rule adjustment unit 203 sets the calculated speed of the movable apparatus 107 as the rule parameter of the traveling rule ID "3".

For the traveling rule having the traveling rule ID "4", the traveling rule adjustment unit 203 first acquires the road width at the current position of the movable apparatus 107 from the map information of the surrounding environment information of the movable apparatus 107. Next, the traveling rule adjustment unit 203 acquires the width and weight of the movable apparatus 107 from the movable apparatus-specific information. If the movable apparatus 107 has a load thereon, the weight of the load is acquired as well.

Next, when the courses of the movable apparatus 107 and an obstacle intersect, the traveling rule adjustment unit 203 determines behavior to be taken by the movable apparatus 107. Specifically, if the movable apparatus 107 can avoid a collision only by shifting the course, the behavior "shift the course" is determined. If there is other behavior that enables avoidance of a collision, the road width is compared with the width of the movable apparatus 107, and if the width of the movable apparatus 107 is smaller than the road width, the behavior "shift the course" is determined. If the width of the movable apparatus 107 is greater than the road width, the behavior "lower the speed" is determined. In order to make the energy required for re-acceleration smaller, the level of speed lowered at that time is determined to be inversely proportional to the weight of the movable apparatus 107 (or the total weight including the weight of the load). In addition, if the width of the movable apparatus 107 is greater than the road width, the behavior "increase the speed" may be determined. In order to make the energy required for acceleration as small as possible at that time, the level of speed increased is determined to be inversely proportional to the total weight of the movable apparatus 107. Next, the traveling rule adjustment unit 203 sets the determined behavior as the rule parameter of the traveling rule ID "4".

For the traveling rule having the traveling rule ID "5", the traveling rule adjustment unit 203 acquires the weight of the movable apparatus 107 from the movable apparatus-specific information (in a case that the movable apparatus 107 has a load thereon, the weight of the load as well). Next, the traveling rule adjustment unit 203 determines behavior taken by the movable apparatus 107 when it turns a corner. Specifically, when the total weight of the movable apparatus 107 is a threshold t1 or greater, the behavior of turning a corner by making a big turn to the side opposite to the turning direction to minimize deceleration (by having a curvature radius equal to or greater than a threshold) is determined. The reason for this operation is to set the movable apparatus 107 to decelerate as small as possible, and if the level of deceleration is high, more energy is needed for re-acceleration as the weight of the movable apparatus 107 becomes heavier. When the total weight of the movable apparatus 107 is less than the threshold t1, the behavior of first stopping in front of the corner or making a turn by decelerating to a threshold or lower is determined. Next, the traveling rule adjustment unit 203 sets the determined behavior as the rule parameter of the traveling rule ID "5".

When there are a plurality of adjustment processes having different rule parameters for the same traveling rule ID, priority is put in advance on each of the adjustment processes, and the adjustment process to be applied may be determined based on the priority. In this case, the priority may be changed based on the control-related information. For example, the two adjustment processes for a traveling rule having the traveling rule ID "3" have been exemplified above. When information of a road surface being wet or icy is acquired as the road surface configuration information, for example, the former process is set to have higher priority to be applied. On the other hand, when the remaining capacity of the battery of the movable apparatus 107 is detected to be lower than a threshold, the latter process is set to have higher priority to be applied.

Third Embodiment

In the first and second embodiments, at least behavioral information of obstacles is used in addition to map information as the control-related information. However, in addition to or instead of use of the behavioral information of obstacles, traveling history information of the movable apparatus 107 can also be used. The traveling history information is information based on movement histories of the movable apparatus 107 and each obstacle present around the movable apparatus 107. The control-related information acquisition unit 202 chronologically records, as the traveling history information, information such as to which side of the path the movable apparatus 107 and obstacles moved in the past or the density of obstacles present on the path. The traveling history information may be information acquired as a result of information analysis about movement histories of each of the movable apparatus and obstacles.

The information processing apparatus 100 periodically analyzes a traveling history of the movable apparatus 107 and a movement history of obstacles once a day, or the like and accumulates their tendency for movement. As an example of a tendency for movement of the movable apparatus 107 or obstacles, the tendency of obstacles mostly traveling on the left side on a path A weekdays from 6:30 to 8:00 is conceivable. In addition, the tendency that the movable apparatus 107 has few histories of being in proximity to an obstacle and the traffic is sparse on a path C weekdays from 12:00 to 13:00 is conceivable.

Figure 8:
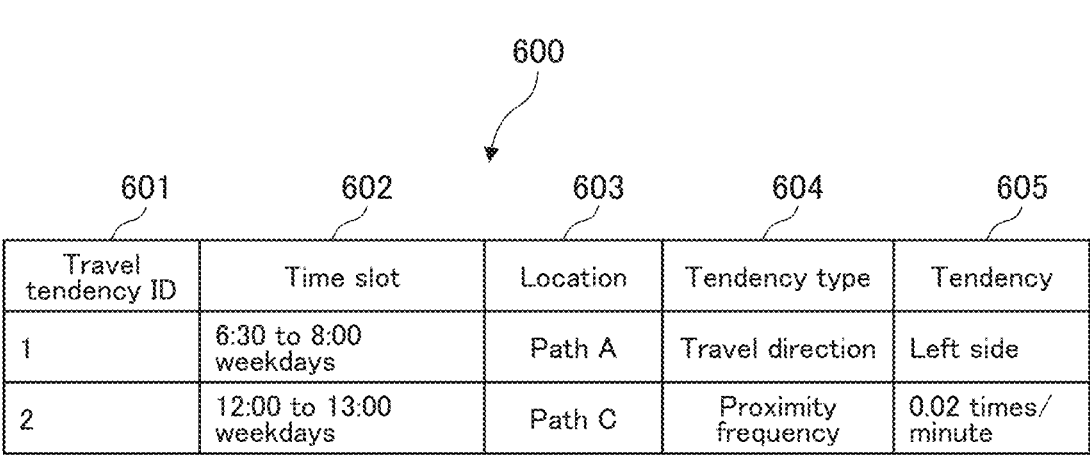
FIG. 8 is a diagram illustrating an example of a travel tendency table according to a third embodiment.

FIG. 8 is a diagram illustrating an example of a travel tendency table obtained by analyzing movement histories of the movable apparatus 107 and obstacles. The travel tendency table 600 is used to manage tendencies of movement of the movable apparatus 107 and obstacles. For an example of the travel tendency table, every row of the travel tendency table 600 represents one travel tendency.

In a travel tendency ID 601, IDs for uniquely identifying traveling tendencies stored in the travel tendency table 600 are described.

In a time slot 602, time slots in which traveling tendencies are shown are described.

In a location 603, locations in which traveling tendencies are shown are described. Values of the location 602 are words by which a location can be identified corresponding to terrain information or information of a series of coordinates indicating a specific region. In a tendency type 604, types of traveling tendencies are described. Further, "proximity frequency" refers to a frequency at which a distance between the movable apparatus 107 and an obstacle is shorter than or equal to the proximity limit distance.

In a tendency 605, details of traveling tendencies are described.

Hereinbelow, a process of the traveling rule adjustment unit 203 to adjust a rule parameter of a traveling rule by using the travel tendency table 600 will be described.

The traveling rule adjustment unit 203 acquires information of a travel tendency having the time slot including the current time from the travel tendency table 600. When the acquired time is a time from 6:30 to 8:00 weekdays, the traveling rule adjustment unit 203 sets the value "left side" in the tendency having the travel tendency ID "1" corresponding to the time as the rule parameter of the traveling rule ID "1" shown in FIG. 3.

Meanwhile, when the acquired time is a time from 12:00 to 13:00 weekdays, the traveling rule adjustment unit 203 determines a speed of the movable apparatus 107 that is inversely proportional to the value "0.02 times/minute" in the tendency having the travel tendency ID "2" corresponding to the time. That is, when the "proximity frequency" has a relatively low value such as "0.02 times/minute", the traveling rule adjustment unit 203 sets a relatively high speed value of the movable apparatus 107 as the rule parameter of the traveling rule ID "3" shown in FIG. 3.

Further, if the travel tendency table 600 has no time slot 602 corresponding to the current time, the traveling rule adjustment unit 203 may perform the process according to the first or second embodiment (mainly, the process of adjusting a traveling rule based on behavioral information of an obstacle, or the like).

The process of adjusting a traveling rule may be performed based on the behavioral information (and map information) of the obstacle as the control-related information. Alternatively, if the travel tendency table 600 has a time slot 602 corresponding to the current time, it may be determined whether to perform any of the adjustment the process according to the first or second embodiment and the adjustment process based on traveling history information at the current time. In this case, the determination may be made based on the control-related information (in particular, the behavioral information of the obstacle).

Fourth Embodiment

In the first embodiment, the traveling rule adjustment unit 203 may adjust a traveling rule, and then return the traveling rule to a default state if a predetermined condition is satisfied. The default state is a state in which a default value is set for the rule parameter of the traveling rule.

FIG. 9 is a diagram illustrating an example of a traveling rules table used to manage traveling rules. Since the traveling rule ID 301 and the traveling rule 302 in the traveling rules table 310 are the same as those shown in FIG. 3, description thereof will be omitted. In a default value 701, default values to the rule parameters of the traveling rules are described.

Figure 10:
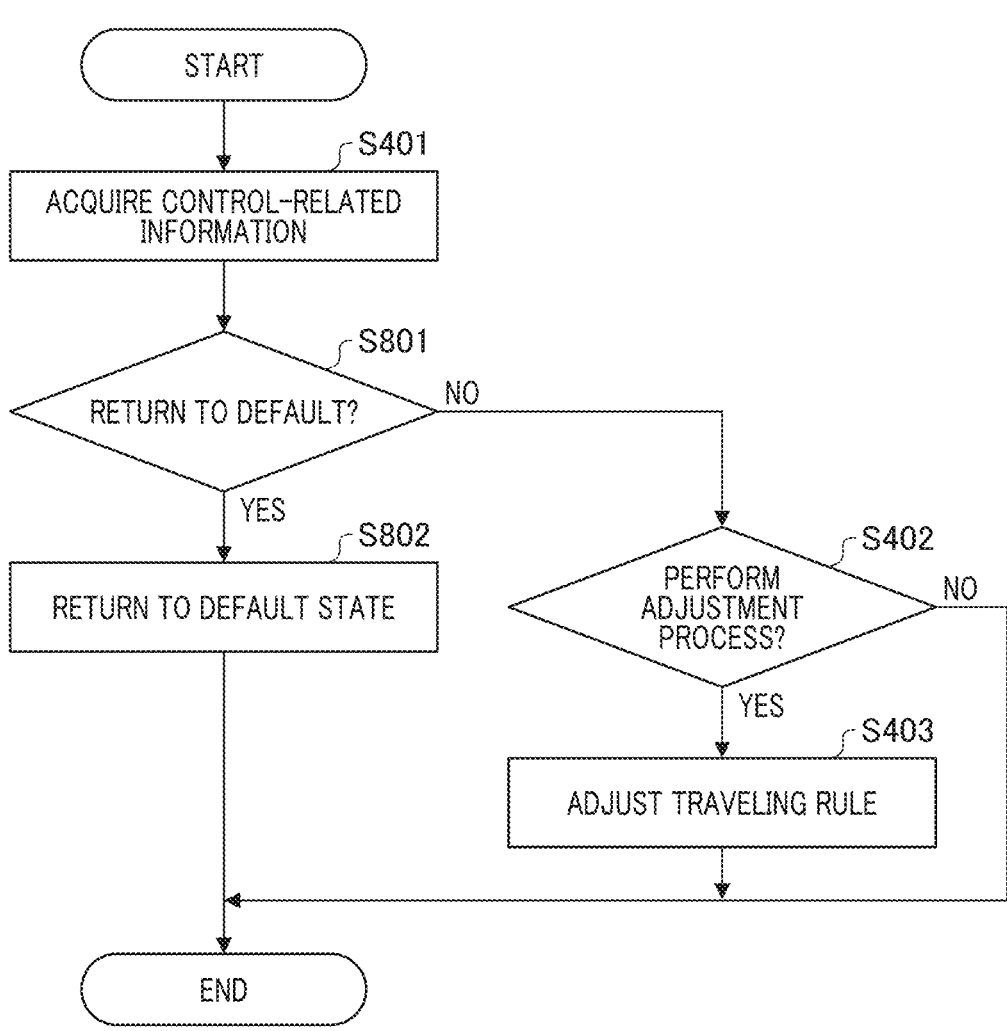
FIG. 10 is a flowchart showing a traveling rule adjustment process according to the fourth embodiment.

FIG. 10 is a flowchart explaining a process of adjusting a traveling rule. The process described in the present flowchart is repeatedly performed at regular time intervals. Further, the interval at which the process is repeatedly performed may be varied according to a distance from the movable apparatus 107 to an obstacle or a density of obstacles. Since S401 to S403 are the same as S401 to S403 shown in FIG. 4A, description thereof will be omitted.

In S801, the traveling rule adjustment unit 203 determines whether to return the traveling rule to the default state. The process proceeds to S802 if returning is determined. The process proceeds to S402 if not returning is determined. S801 is an example of a process of an adjustment means to set the rule parameter of the traveling rule to the default value based on a predetermined condition.

To determine whether to return the traveling rule to the default state, it is first checked whether a predetermined period of time or more has elapsed from the previous adjustment of the traveling rule was performed. If the predetermined period of time or more has elapsed, the process proceeds to the next step. If not, the traveling rule adjustment unit 203 determines not to return the traveling rule to the default state.

In addition, the traveling rule adjustment unit 203 may further check whether the movable apparatus 107 has moved a predetermined distance or longer from the point at which the previous adjustment of the traveling rule was performed. In this case, if the predetermined period of time or more has elapsed and the movable apparatus has moved the predetermined distance or longer, the process may proceed to the next step. In other cases, the traveling rule adjustment unit 203 determines not to return the traveling rule to the default state.

Next, the traveling rule adjustment unit 203 checks whether the movable apparatus 107 is a predetermined distance or farther away from an obstacle, a corner, a door, or the like. If it is away therefrom, it is determined to return the traveling rule to the default state. If not, the traveling rule adjustment unit 203 determines not to return the traveling rule to the default state.

Specifically, in S802, for each traveling rule managed in the traveling rules table 310 shown in FIG. 9, the traveling rule adjustment unit 203 acquires the default value of the rule parameter and sets the rule parameter of the traveling rule 302 to the default value.

Note that, when determining whether to adjust the traveling rule in S402, the traveling rule adjustment unit 203 checks whether a predetermined period of time or longer has elapsed from the traveling rule was previously adjusted (S4021 in FIGS. 4B and 7). When the traveling rule has returned to the default state in the previous process shown in FIG. 8 (S802), the traveling rule adjustment unit 203 interprets that the traveling rule was previously adjusted in the checking.

According to this operation, the period in which the traveling rule is in the default state increases in the present embodiment, compared with the above-described first to third embodiments. Therefore, obstacles (people or robots) present around the movable apparatus 107 can easily predict behavior of the movable apparatus 107, which improves safety.

In the present embodiment, the elapsed time from the previous adjustment of the rule parameter and behavioral information of the movable apparatus 107 are exemplified as targets of the determination process for performing adjustment of the rule parameter (predetermined condition). However, targets of the determination process are not limited thereto, and other control-related information, for example, behavioral information of an obstacle, may be employed as a target.

Further, the order of the two steps (checking the elapsed time and checking the behavioral information of the movable apparatus 107) in the process of determining whether to return the traveling rule to the default state described above may be reversed.

Fifth Embodiment

In each of the above-described embodiments, drive control information of the movable apparatus 107 is generated from an adjusted traveling rule and the drive state (behavior) of the movable apparatus 107 is changed. In the fifth embodiment, the information processing apparatus 100 may notify a person or a robot present around the movable apparatus 107 of the drive state of the movable apparatus 107 to be changed. This informing process is performed after S501 and before S502 shown in FIG. 6, or is started after S502 and before the movable apparatus 107 changes its drive state.

The information processing apparatus 100 notifies a person or a robot present around the movable apparatus 107 of the details about the change in the drive state. While changing behavior, the information processing apparatus 100 may continuously transmit the notification indicating the change. "While changing a drive state" means, for example, "while the movable apparatus 107 is changing the course to the left or right side of the path", "while the movable apparatus is turning a corner", "while the movable apparatus is changing the speed (accelerating or decelerating)", or the like.

As a notification method, there is a method of mounting a speaker for notification on the movable apparatus 107 to give an audio notification. Alternatively, there is a method of mounting a display for notification on the movable apparatus 107 to show the drive state of the movable apparatus 107 on the display. In addition, there is a method of mounting a communication apparatus on the movable apparatus 107 to directly transmit a signal indicating the drive state of the movable apparatus 107 to another communication-enabled robot by using the communication apparatus.

Alternatively, the information processing apparatus 100 may cause the movable apparatus 107 to present the details of the change in the drive state to a third party before changing the drive state, receive approval from the third party, and then change the drive state.

According to the present embodiment, the movable apparatus 107 can change the drive state while a person or a robot present around the movable apparatus 107 is paying attention to the behavior of the movable apparatus 107 due to a notification, and thus safety of the person or robot is improved. Safety is further ensured by giving a notification at the time of changing the course to the left or right side of the path, turning a corner, increasing the speed, and the like.

Further, the speaker, the display, the function of generating and transmitting a signal indicating a drive state for notification, and the like in the present embodiment are examples of a notification means for giving a notification about a change in the drive state of the movable apparatus before the movable apparatus is driven according to control of the control means.

Sixth Embodiment

Although a traveling rule is expressed by using a rule parameter in each of the above-described embodiments, in a sixth embodiment, a traveling rule is expressed by using a graph indicating a positional relationship between terrain, the movable apparatus 107, and an obstacle. In the present embodiment, terrain, the movable apparatus 107, and obstacles are collectively referred to as "objects".

Figure 11A:
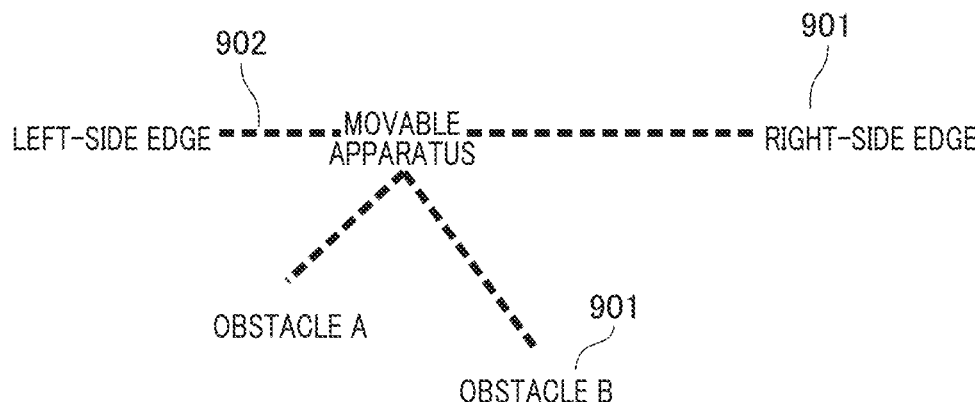
FIGS. 11A and 11B are diagrams illustrating an example of object position relationship graphs according to a sixth embodiment.
Figure 11B:
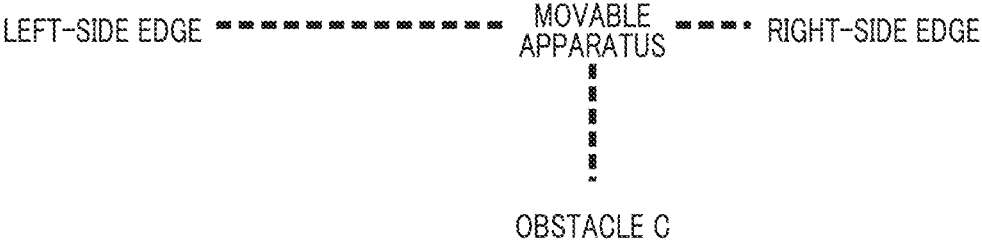

FIGS. 11A and 11B are diagrams illustrating graphs representing positional relationships of objects (which will be referred to as object positional relationship graphs). There is a possibility of a positional relationship of the objects differing at each point on a travel route, and FIGS. 11A and 11B illustrate a positional relationship of the objects at different points.

These object positional relationship graphs are examples of undirected graphs having the movable apparatus 107 and an object around the movable apparatus 107 as nodes. Two objects 901 are related to each other by relationship lines 902 connecting them. In the present embodiment, a relation between objects around the movable apparatus 107 is expressed. A length of the relationship lines 902 represents the magnitude of a relation between the objects. In the present embodiment, a length of the relationship lines 902 indicates a distance between the objects 901. As the relationship lines 902 become shorter, the objects 901 connected by the relationship lines 902 can be closer.

A distance corresponding to a length of the relationship lines 902 is typically a proximity limit distance. However, the distance is not limited to the proximity limit distance, and may be longer by a predetermined distance, or may be a distance calculated based on the proximity limit distance and/or control-related information.

Figure 12:
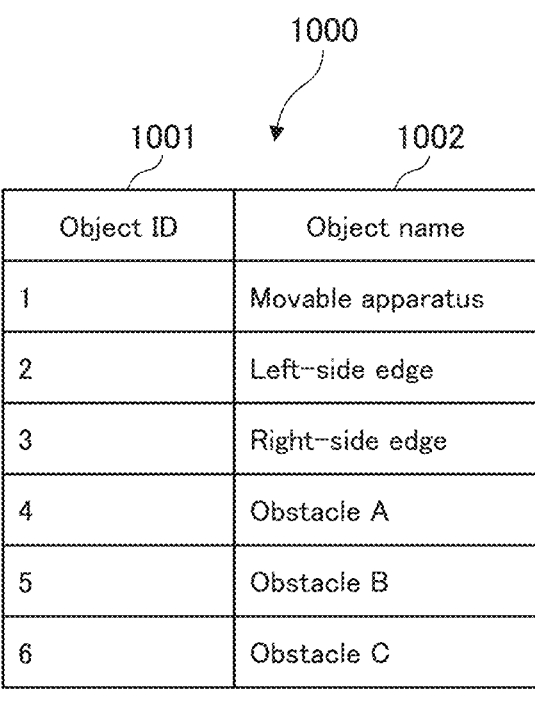
FIG. 12 is a diagram illustrating an example of an object table according to the sixth embodiment.

FIG. 12 is a diagram illustrating an example of an object table used for managing the objects 901. Each row of the object table 1000 represents one object 901.

In an object ID 1001, IDs for uniquely identifying the objects 901 stored in the object table 1000 are described.

In an object name 1002, names of the objects 901 are described.

FIG. 13 is a diagram illustrating an example of a positional relationship information table used for managing positional relationships of the objects 901.

In a positional relationship information ID 1101, IDs for uniquely identifying positional relationship information stored in the positional relationship information table 1100 are described.

In a valid range 1102, locations in which positional relationship information is valid are described. Values of the valid range 1102 are words by which a location can be identified corresponding to terrain information or information of a series of coordinates indicating a specific region. The valid range 1102 is used to specify an object positional relation graph at a specific location.

In an object ID(1) 1103, the ID of one object among two related objects 901 is described. Further, in the example illustrated in FIG. 13, the object ID(1) is fixed to "1" of the movable apparatus.

In an object ID(2) 1104, the ID of the object that is not the object identified in the object ID(1) 1103 among two related objects is described.

In a relationship value 1105, a value representing the magnitude of the relationship between two objects is described. A relation value corresponds to a length of a relationship line.

In one row of the positional relationship information table 1100, particularly, the object ID(1) 1103, the object ID(2) 1104, and the relationship value 1105 correspond to one piece of positional relation information.

Figure 14:
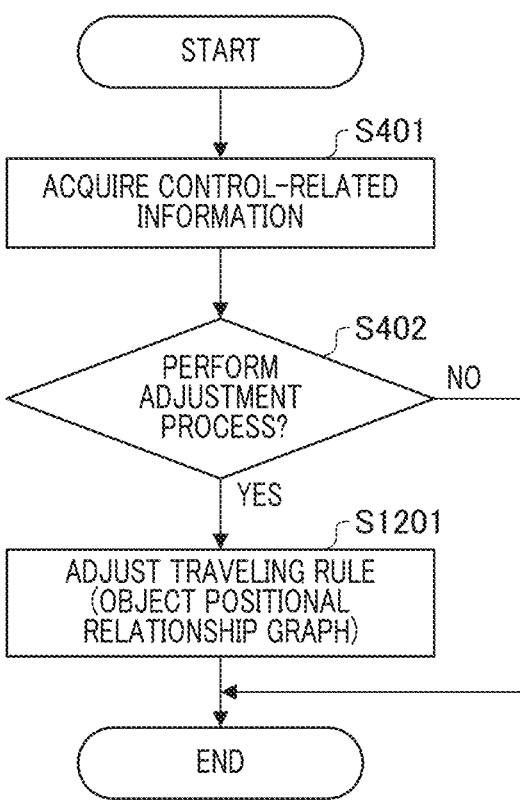
FIG. 14 is a flowchart showing a traveling rule adjustment process according to the sixth embodiment.

FIG. 14 is a flowchart explaining a process of adjusting a traveling rule. This process is repeatedly performed at regular time intervals. Further, the interval at which the process is performed may be varied according to a distance from the movable apparatus 107 to an obstacle or a density of obstacles. Since S401 and S402 are the same as those shown in FIG. 4A, description thereof will be omitted.

In S1201, the traveling rule adjustment unit 203 adjusts a traveling rule. In this case, the traveling rule corresponds to an object positional relationship graph, and a rule parameter of the traveling rule corresponds to a length of a relationship line 902. Specifically, the traveling rule adjustment unit 203 performs a process of adjusting a rule parameter as exemplified below.

As a first method for the adjustment process, the traveling rule adjustment unit 203 acquires terrain information (map information) from the travel control information management unit 201. In addition, the traveling rule adjustment unit 203 acquires each piece of positional information of the movable apparatus 107 and obstacles from the control-related information acquisition unit 202. Next, the traveling rule adjustment unit 203 obtains the positional relationship between each of the obstacles and the left and right-side edges of the path. When there is a bias of the obstacles to either side of the left and right sides of the path, the traveling rule adjustment unit 203 adjusts the length from an object 901 representing the movable apparatus 107 to objects 901 corresponding to both side edges of the path in the object positional relationship graph. At this time, the length of the relationship line 901 from the movable apparatus 107 to the side with the bias of the obstacles out of the left and right sides of the path is set to be shorter than the length from the movable apparatus 107 to the relationship line 902 corresponding to the side with no bias out of the left and right sides of the path. This is because the traveling rule adjustment unit 203 adjusts (reduces) the distance to the side edge having the bias to allow the movable apparatus 107 to pass on the side with the bias of the obstacles as illustrated in the right side of FIG. 5.

As a method of adjusting a length of the relationship line 902 in the object positional relationship graph, for example, there is the following method. The traveling rule adjustment unit 203 acquires a valid range corresponding to the current position of the movable apparatus 107 with reference to the positional relationship information table 1100. There are multiple possibilities for the acquired valid range (corresponding to positional relationship information ID). Among these, the traveling rule adjustment unit 203 adjusts a corresponding relationship value, which is a target of length adjustment, of the positional relationship information (the object ID(1) 1103, the object ID(2) 1104, and the relationship value 1105) including the relationship value.

As a second method for the adjustment process, the traveling rule adjustment unit 203 acquires the position of the movable apparatus 107 and the density of the obstacles present around the movable apparatus 107 from the control-related information acquisition unit 202. Next, the traveling rule adjustment unit 203 determines a target distance from the movable apparatus 107 to the obstacles based on the acquired density of the obstacles. For the method of calculating the target distance based on the density of the obstacles, the method described in the first embodiment above is used. Then, the traveling rule adjustment unit 203 performs adjustment to make the length of the relationship line 902 from the object 901 representing the movable apparatus 107 to the objects 901 representing the obstacles in the object positional relationship graph match the target distance.

Specifically, the traveling rule adjustment unit 203 acquires the positional relationship information (the object ID(1) 1103, the object ID(2) 1104, and the relationship value 1105) based on the current position of the movable apparatus 107 and the valid range with reference to the positional relationship information table 1100. Then, the traveling rule adjustment unit 203 sets the above-described determined target distance for the relationship value 1105 of the positional relationship information. Here, the target distance may be determined by using a lookup table of "density of obstacles" and "target distance", or may be determined by using a function of the "target distance" having a "density of obstacles" as a parameter.

Figure 15:
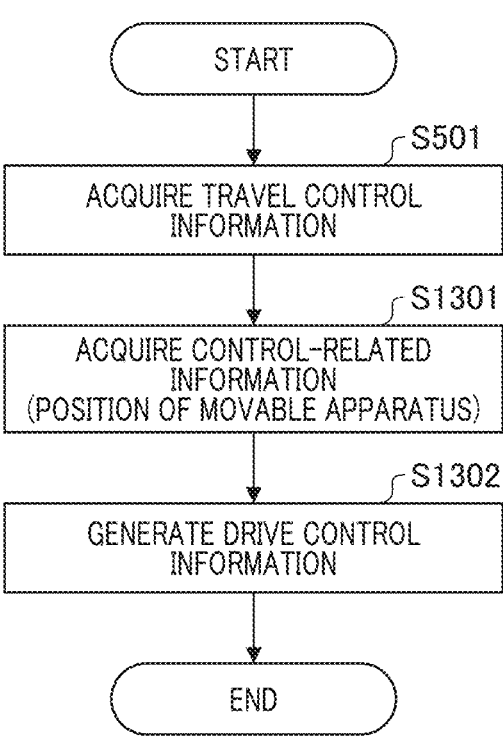
FIG. 15 is a flowchart explaining a process of generating drive control information according to the sixth embodiment.

FIG. 15 is a flowchart explaining a process of generating drive control information according to the present embodiment. The present process is performed each time a traveling rule (object positional relationship graph) is adjusted. Since S501 is the same as S501 of FIG. 6, description thereof will be omitted.

In S1301, the drive control information generation unit 204 acquires the positional information of the movable apparatus 107 out of the control-related information from the control-related information acquisition unit 202.

In S1302, the drive control information generation unit 204 generates drive control information based on the traveling rule. Specifically, the drive control information generation unit 204 acquires the positional relationship information based on the position of the movable apparatus 107 and the valid range with reference to the positional relationship information table 1100. Then, the drive control information generation unit 204 performs a process of generating drive control information on an object positional relationship graph represented by the positional relationship information as exemplified below.

The drive control information generation unit 204 performs a process as follows. The drive control information generation unit 204 obtains the amount of travel route correction at the position of the movable apparatus 107 based on the map information, relationship value, and the distance from the movable apparatus 107 to the side edges of the path (both left and right edges), and sets the amount as drive control information. The distance from the movable apparatus 107 to the side edges of the path may be, for example, a predetermined constant value, or a value represented by a function of the "distance to the side edges of the path" having "each point on the travel route" as a parameter.

The relationship value for obtaining the amount of travel route correction is a relationship value at which the adjustment process is performed in S1201. In other words, the drive control information generation unit 204 acquires not only the relationship value 1105 for both side edges of the path as the object 901 but also the relationship value 1105 for other objects 901 to obtain the amount of travel route correction. In other words, the drive control information generation unit 204 generates drive control information based on a plurality of pieces of the positional relationship information of the positional relationship information table 1100.

As described above, the present embodiment introduces the graphs representing the positional relationships of the movable apparatus 107, terrain, and obstacles to express the traveling rule. In other words, the traveling rule can be expressed by a simple weighted undirected graph, and thus the process of adjusting the traveling rule can be simplified.

Other Embodiment

Although the movable apparatus 107 is assumed to move within a facility in each of the embodiments, the movable apparatus 107 can also be assumed to travel on public roads as a vehicle.

Although the embodiments have been described in detail above, the present disclosure can adopt an implementation mode as, for example, a system, an apparatus, a method, a program, a recording medium (storage medium), or the like. Specifically, the present disclosure may be applied to a system composed of a plurality of devices (for example, a host computer, an interface device, an imaging apparatus, a web application, and the like), or may be applied to an apparatus composed of one device.

In addition, it is needless to say that an objective of the present disclosure is achieved by performing as follows. In other words, a recording medium (or a storage medium) in which program codes (computer programs) of software realizing the above-described functions of the embodiments are recorded is supplied to a system or an apparatus. Such a storage medium is of course a computer-readable storage medium. In addition, a computer (or a CPU or an MPU) of the system or the apparatus may read and execute the program codes stored in the recording medium. In this case, the program codes themselves read from the recording medium realize the functions of the above-described embodiments, and the recording medium in which the program codes are recorded constitutes the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-096751, filed Jun. 13, 2023, which is hereby incorporated by reference wherein in its entirety.

What is claimed is:

1. An information processing apparatus comprising:
a memory storing instructions; and
a processor executing the instructions causing the information processing apparatus to:
acquire control-related information that includes dynamically changing environment information used for controlling a movable apparatus used for traveling within a facility, wherein the environment information includes map information and behavioral information of a plurality of obstacles present around the movable apparatus;
adjust, based on the acquired control-related information, a traveling rule that is followed by the movable apparatus; and
control driving of the movable apparatus based on information of the adjusted traveling rule,
wherein, when adjusting the travel rules, execution of the stored instructions by the processor further causes the information processing apparatus to:
calculate distances from the positions of the plurality of obstacles to both edges of a path on which the movable apparatus is traveling for each obstacle among the plurality of obstacles based on the environment information;
determine whether or not the plurality of obstacles are biased in a width direction of the path based on the calculated distances; and
determine the travel of the movable apparatus on a side in which a bias occurs as the traveling rule in a case where the plurality of obstacles are biased and a progress direction of the movable apparatus is the same as progress directions of the plurality of obstacles.

2. The information processing apparatus according to claim 1,
wherein information of the traveling rule includes a variable rule parameter, and the processor adjusts the rule parameter.

3. The information processing apparatus according to claim 2, wherein execution of the stored instructions by the processor further causes the information processing apparatus to
adjust the rule parameter based on a density of each of one or more obstacles present around the movable apparatus.

4. The information processing apparatus according to claim 2, wherein execution of the stored instructions by the processor further causes the information processing apparatus to
set the rule parameter of the traveling rule to a default value based on a predetermined condition.

5. The information processing apparatus according to claim 4, wherein execution of the stored instructions by the processor further causes the information processing apparatus to set the rule parameter to the default value based on, a predetermined condition including one or more of a time that has elapsed from previous adjustment of the rule parameter and behavioral information of the movable apparatus of the control-related information.

6. The information processing apparatus according to claim 2, wherein execution of the stored instructions by the processor further causes the information processing apparatus to
acquire the traveling rule as an undirected graph having the movable apparatus and an object around the movable apparatus as nodes.

7. The information processing apparatus according to claim 6,
wherein the undirected graph includes a relationship line connecting the nodes as the rule parameter, and
a length of the relationship line indicates a distance from the movable apparatus to the object around the movable apparatus.

8. The information processing apparatus according to claim 1, wherein execution of the stored instructions by the processor further causes the information processing apparatus to
determines whether to adjust the traveling rule based on a predetermined condition.

9. The information processing apparatus according to claim 8,
wherein the predetermined condition includes one or more of a time that has elapsed from previous adjustment of the traveling rule, behavioral information of the movable apparatus of the control-related information, and behavioral information of the obstacle present around the movable apparatus.

10. The information processing apparatus according to claim 8,
wherein the predetermined condition includes one or more of a time that has elapsed from previous adjustment of the traveling rule, movable apparatus-specific information of the control-related information, and road surface configuration information of a travel route of the movable apparatus of the control-related information.

11. The information processing apparatus according to claim 10, wherein execution of the stored instructions by the processor further causes the information processing apparatus to
when it is determined to adjust the traveling rule, calculate a speed of the movable apparatus based on the movable apparatus-specific information and the road surface configuration information and adjusts the traveling rule based on the speed of the movable apparatus.

12. The information processing apparatus according to claim 1, wherein execution of the stored instructions by the processor further causes the information processing apparatus to
apply weighting on an input value of calculation in the process of adjusting the traveling rule.

13. The information processing apparatus according to claim 1, wherein execution of the stored instructions by the processor further causes the information processing apparatus to
adjust the traveling rule based on traveling history information included in the control-related information, the traveling history information being based on a movement history of each of the movable apparatus and an obstacle present around the movable apparatus.

14. The information processing apparatus according to claim 1, wherein execution of the stored instructions by the processor further causes the information processing apparatus to provide a notification that a drive state of the movable apparatus is to be changed before the movable apparatus is driven.

15. A movable apparatus comprising an information processing apparatus that controls traveling path of the movable apparatus, the information processing apparatus comprising:

a memory storing instructions; and a processor executing the instructions causing the information processing apparatus to:

acquire control-related information that includes dynamically changing environment information used for controlling the movable apparatus used for traveling within a facility, wherein the environment information includes map information and behavioral information of a plurality of obstacles present around the movable apparatus;

adjust, based on the acquired control-related information, a traveling rule that is followed by the movable apparatus; and control driving of the movable apparatus based on information of the adjusted traveling rule, wherein, adjusting the travel rules includes:

calculating distances from the positions of the plurality of obstacles to both edges of a path on which the movable apparatus is traveling for each obstacle among the plurality of obstacles based on the environment information;

determining whether or not the plurality of obstacles are biased in a width direction of the path based on the calculated distances; and determining the travel of the movable apparatus on a side in which a bias occurs as the traveling rule in a case where the plurality of obstacles are biased and a progress direction of the movable apparatus is the same as progress directions of the plurality of obstacles.

16. A non-transitory storage medium storing a computer program of an information processing apparatus controlling travel of a movable apparatus causing a computer to perform each step of a processing method for the information processing apparatus, the processing method comprising:

acquiring control-related information that includes dynamically changing environment information used for controlling the movable apparatus used for traveling within a facility, wherein the environment information includes map information and behavioral information of a plurality of obstacles present around the movable apparatus;

adjusting, based on the acquired control-related information, a traveling rule that is followed by the movable apparatus; and controlling driving of the movable apparatus based on information of the adjusted traveling rule, wherein, adjusting the travel rules includes:

calculating distances from the positions of the plurality of obstacles to both edges of a path on which the movable apparatus is traveling for each obstacle among the plurality of obstacles based on the environment information;

determining whether or not the plurality of obstacles are biased in a width direction of the path based on the calculated distances; and determining the travel of the movable apparatus on a side in which a bias occurs as the traveling rule in a case where the plurality of obstacles are biased and a progress direction of the movable apparatus is the same as progress directions of the plurality of obstacles.

17. The non-transitory storage medium according to claim 16 further comprising:

acquiring control-related information that includes dynamically changing environment information used for controlling a movable apparatus;

adjusting, based on the acquired control-related information, a traveling rule that is followed by the movable apparatus; and controlling driving of the movable apparatus based on travel control information including the adjusted traveling rule.

* * * * *